United States Patent [19]

Inuyama et al.

[11] Patent Number: 5,151,910
[45] Date of Patent: Sep. 29, 1992

[54] LIGHT QUANTITY CONTROL DEVICE

[75] Inventors: Toshihiko Inuyama; Junichi Kimizuka, both of Kanagawa; Makoto Abe, Chiba; Akihisa Kusano; Kaoru Sato, both of Kanagawa; Kazuhiko Okazawa; Masanori Ishizu, both of Tokyo; Toshiyuki Ito, Kanagawa, all of Japan

[73] Assignee: Canon Kabushiki Kaisha, Tokyo, Japan

[21] Appl. No.: 588,331

[22] Filed: Sep. 26, 1990

[30] Foreign Application Priority Data

Sep. 26, 1989 [JP] Japan .................................. 1-247929

[51] Int. Cl.⁵ .............................................. H01S 3/13
[52] U.S. Cl. ...................................... 372/31; 372/29; 372/38
[58] Field of Search ............................. 372/29, 31, 38

[56] References Cited

U.S. PATENT DOCUMENTS

| | | | |
|---|---|---|---|
| 4,624,547 | 11/1986 | Endo et al. ........................ 355/14 E |
| 4,695,714 | 9/1987 | Kimizuka et al. .................. 250/205 |
| 4,802,179 | 1/1989 | Negishi ............................... 372/38 |
| 4,890,288 | 12/1989 | Inuyama et al. ..................... 372/31 |
| 4,899,344 | 2/1990 | Shibata et al. ....................... 372/29 |
| 4,899,348 | 2/1990 | Kiya et al. ........................... 372/38 |
| 4,907,236 | 3/1990 | Shimada .............................. 372/31 |
| 4,926,433 | 5/1990 | Imamura et al. ..................... 372/50 |
| 4,972,210 | 11/1990 | Woo ................................... 346/108 |
| 4,985,896 | 1/1991 | Kimizuka et al. ..................... 372/38 |
| 5,008,888 | 4/1991 | Numata et al. ....................... 372/29 |

FOREIGN PATENT DOCUMENTS 20251740  1/1988  European Pat. Off. .
1025491  12/1988  European Pat. Off. .

Primary Examiner—Georgia Y. Epps
Attorney, Agent, or Firm—Fitzpatrick, Cella, Harper & Scinto

[57] ABSTRACT

A light quantity control device suitable for use in a laser beam printer includes a beam generator, a monitor for monitoring the quantity of light of a beam generated by the beam generator, and a controller. The controller controls the light quantity of the beam generated by the beam generator in response to the output of the monitor. The controller includes a digital value output circuit and a light quantity control circuit. The digital value output circuit outputs a digital value representing the quantity of light of the beam, and the light quantity control circuit controls the quantity of light in response to the digital value. The digital value output circuit varies the timing of output of the digital value in accordance with the output of the monitor.

17 Claims, 12 Drawing Sheets $$X_D = \begin{array}{cccccc} 2^n & 2^{n-1} & & 2^2 & 2^1 & 2^0 \\ D_n & D_{n-1} & \cdots\cdots & D_2 & D_1 & D_0 \end{array}$$

| $X_D$ | $D_n$ | $D_{n-1}$ | ... | $D_2$ | $D_1$ | $D_0$ |
|---|---|---|---|---|---|---|
| 0 = | 0 | 0 | .......... | 0 | 0 | 0 |
| 1 = | 0 | 0 | .......... | 0 | 0 | 1 |
| 2 = | 0 | 0 | .......... | 0 | 1 | 0 |
| 3 = | 0 | 0 | .......... | 0 | 1 | 1 |
| ⋮ | | | | | | |
| m = | 1 | 1 | .......... | 1 | 1 | 1 |

UP-COUNTING ↓    DOWN-COUNTING ↑

LASER CURRENT $I_\ell$ vs COUNT VALUE $X_D$

P1, P2, P3: RECORDING SHEET

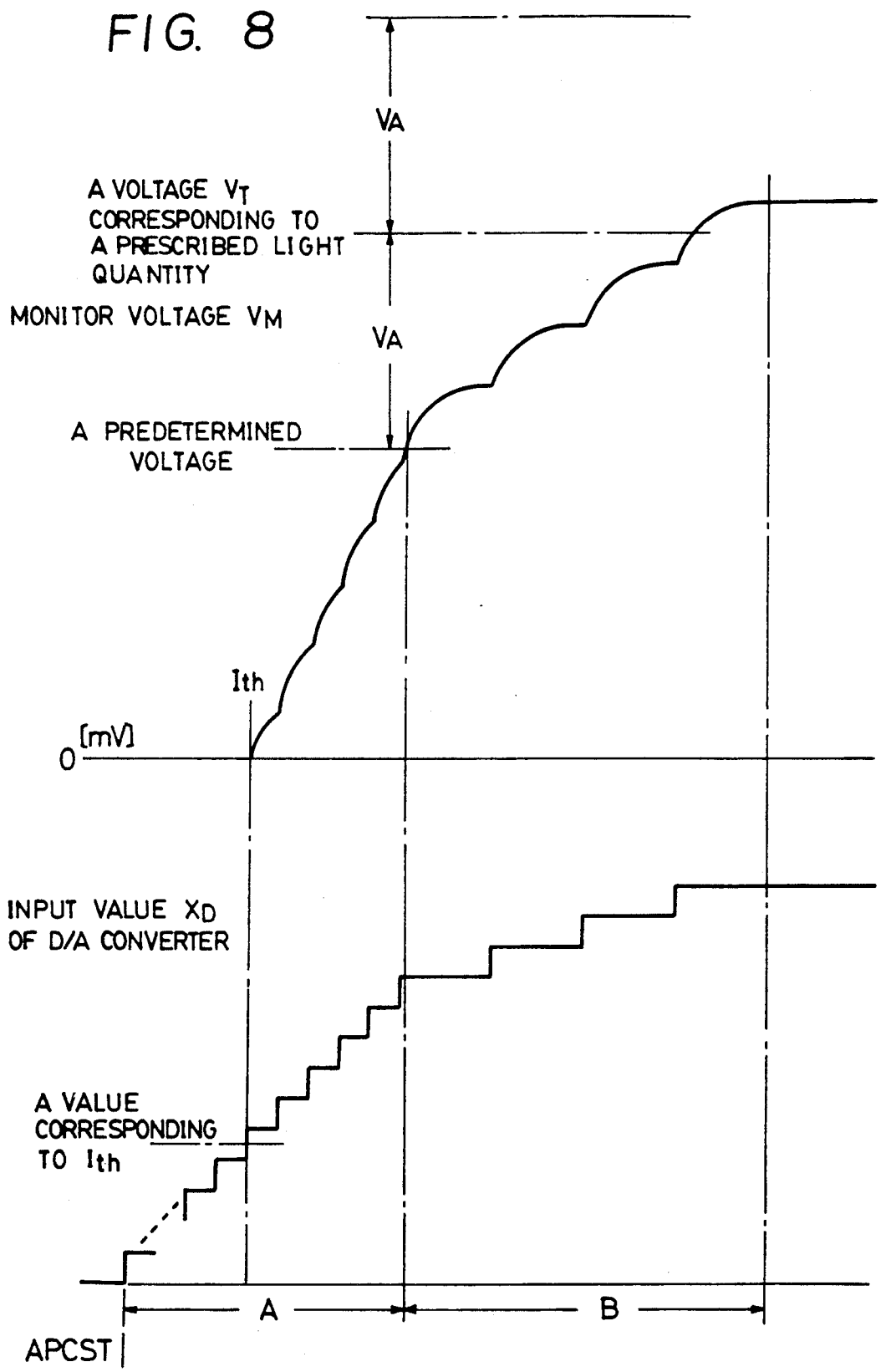

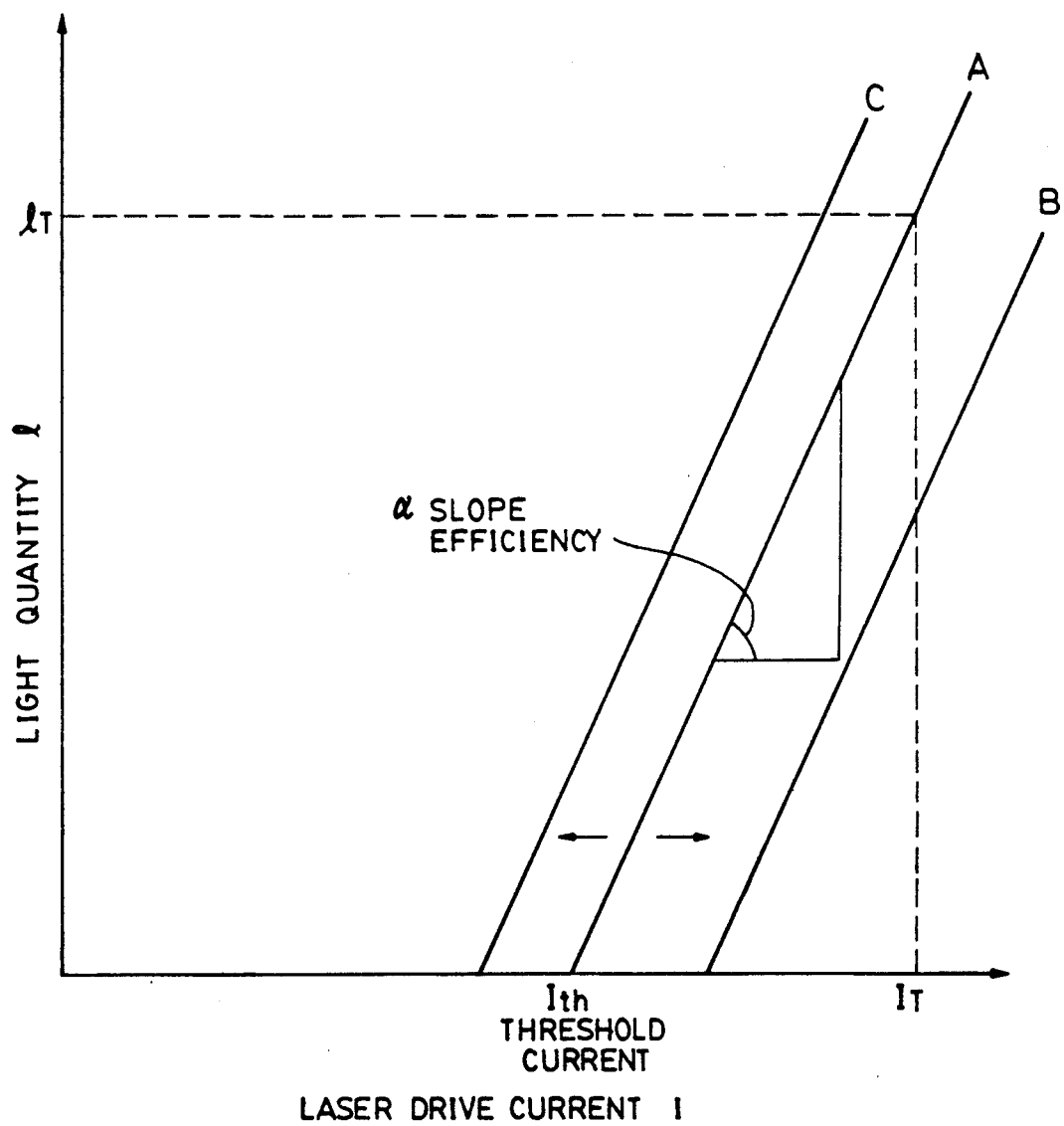

1

LIGHT QUANTITY CONTROL DEVICE

BACKGROUND OF THE INVENTION

1. Field of the Invention

This invention relates to a light quantity control device adapted for use in a beam recording apparatus or the like.

2. Related Background Art

In a known image recording apparatus, such as a laser beam printer, a semiconductor laser which emits a laser beam is used as a practical light source.

The semiconductor laser has an unique light quantity characteristic (I-l characteristic) between a laser driving current "I" and a emitted light quantity "l" as shown in FIG. 13. In FIG. 13, the vertical axis denotes the light quantity "l", and the horizontal axis denotes the laser driving current "I". The semiconductor laser does not emit the laser beam until the laser driving current "I" reaches a threshold value "$I_{th}$", but emits the laser beam when the laser driving current "I" exceeds the threshold value "$I_{th}$" (such region is referred to generically as tHE "LED emitting region"). In the laser beam emitting region, the light quantity "l" has a certain slope "$\propto$" relative to the laser driving current "I".

In the known image recording apparatus, the laser is set to a non-emitting state (i.e., the laser output is set to zero) at first before initiating the printing of each page. The laser driving current "$I_T$" is determined in such a way that a desirable prescribed light quantity "$l_T$" can be obtained by monitoring the laser output and by controlling the laser driving current. The image recording apparatus holds the prescribed light quantity "$l_T$" constant by performing constant-current driving of the laser driving current "$I_T$" corresponding to the prescribed light quantity "$l_T$."

However the I-l characteristic of the semiconductor laser, which has an initial form "A" as shown in FIG. 13, may vary to a form "B" or "C" due to variation in the chip temperature. Accordingly, in the laser beam printer, a constant-current driving circuit executes light quantity control (APC or auto power control) by clearing the laser output before initiating the printing of each page so as always to perform each printing operation with the desirable prescribed light quantity "$l_T$".

A method for deciding the current value of the constant-current driving circuit is proposed in U.S. Pat. No. 4,890,288, which method controls the current value by utilizing an IC (D/A converter) for converting a digital value into an analog value.

However, the conventional light quantity control device, which can control the light quantity characteristic to the driving current of the semiconductor laser by utilizing the D/A convertor, suffers from the problem that the bit number of the D/A converter increases in the case where a precise light quantity control is required. That is, the conventional control device takes a lot of time to complete the light quantity control because of the large number of up-counting steps for controlling the drive current increase in the case where the counting operation is initiated from a clear state.

SUMMARY OF THE INVENTION

Accordingly, an object of the present invention is to provide a light quantity control device that can overcome the problems described above.

Another object of the present invention is to provide an improved light quantity control device.

Still another object of the present invention is to provide a light quantity control device for enabling recording of high quality.

It is still another object of the present invention to provide a light quantity control device capable of efficient light quantity control.

Still another object of the present invention is to provide a light quantity control device capable of precise and accurate light quantity control.

Still another object of the present invention is to provide a light quantity control device capable of light quantity control with a simple structure.

Still another object of the present invention is to provide a light quantity control device capable of highly reliable light quantity control.

Still another object of the present invention is to provide a light quantity control device capable of preventing deterioration of an image.

It is still another object of the present invention to provide a light quantity control device capable of light quantity control with high speed.

Still another object of the present invention is to provide a light quantity control device capable of stabilized light quantity control.

In accordance with a preferred embodiment, the light quantity control device of the present invention includes a beam generator. A monitor monitors the qunatity of light of a beam generated by the beam generator. A controller then controls the light quantity of the beam generated by the beam generator in response to the output of the monitor. The controller includes a digital value output circuit and a light quantity control circuit. The digital value output circuit outputs a digital value representing a quantity of light of the beam. The light quantity control circuit controls the quantity of light in response to receiving the digital value. The digital value output circuit varies the timing of output of the digital value in accordance with the output of the monitor.

In accordance with another aspect of the present invention, the light quantity control device includes a beam generator. A monitor monitors the quantity of light of a beam generated by the beam generator. A controller then controls the light quantity of the beam generated by the beam generator in response to the output of the monitor. The controller includes a counter circuit and a discrimination circuit. The counter circuit counts a digital count value representing a quantity of light of the beam. The discrimination circuit discriminates whether the output of the monitor reaches a predetermined level. The counter circuit varies the digital count value at first speed when the discrimination circuit discriminates that the output of the monitor is lower than the predetermined level, and varies the digital count value at second speed when the discrimination circuit discriminates that the output of the monitor reaches the predetermined level.

In accordance with still another aspect of the invention, the light quantity control device includes a beam generator. A monitor monitors the quantity of light of a beam generated by the beam generator. A controller then controls the light quantity of the beam generated by the beam generator in accordance with the output of the monitor. The controller includes a digital value output circuit. The digital value output circuit outputs a digital value representing a quantity of light of the beam. In a first mode, the digital value output circuit varies the changing speed of the digital value, and in a second mode, the digital value output circuit varies the amount of change of the digital value.

Other objects, features, and advantages of the invention will become apparent from the following detailed description of the preferred embodiments of the present invention and the accompanying drawings.

BRIEF DESCRIPTION OF THE DRAWINGS

FIG. 8 is a chart showing the relation between the monitor voltage of an initial APC processing and the count value;

FIG. 13 is a chart showing a light quantity characteristic of a light source to which the light quantity control device is applied.

DETAILED DESCRIPTION OF THE PREFERRED EMBODIMENTS

Three preferred embodiments of the present invention will be described in detail herein with reference to the accompanying drawings.

EMBODIMENT 1

Figure 1:
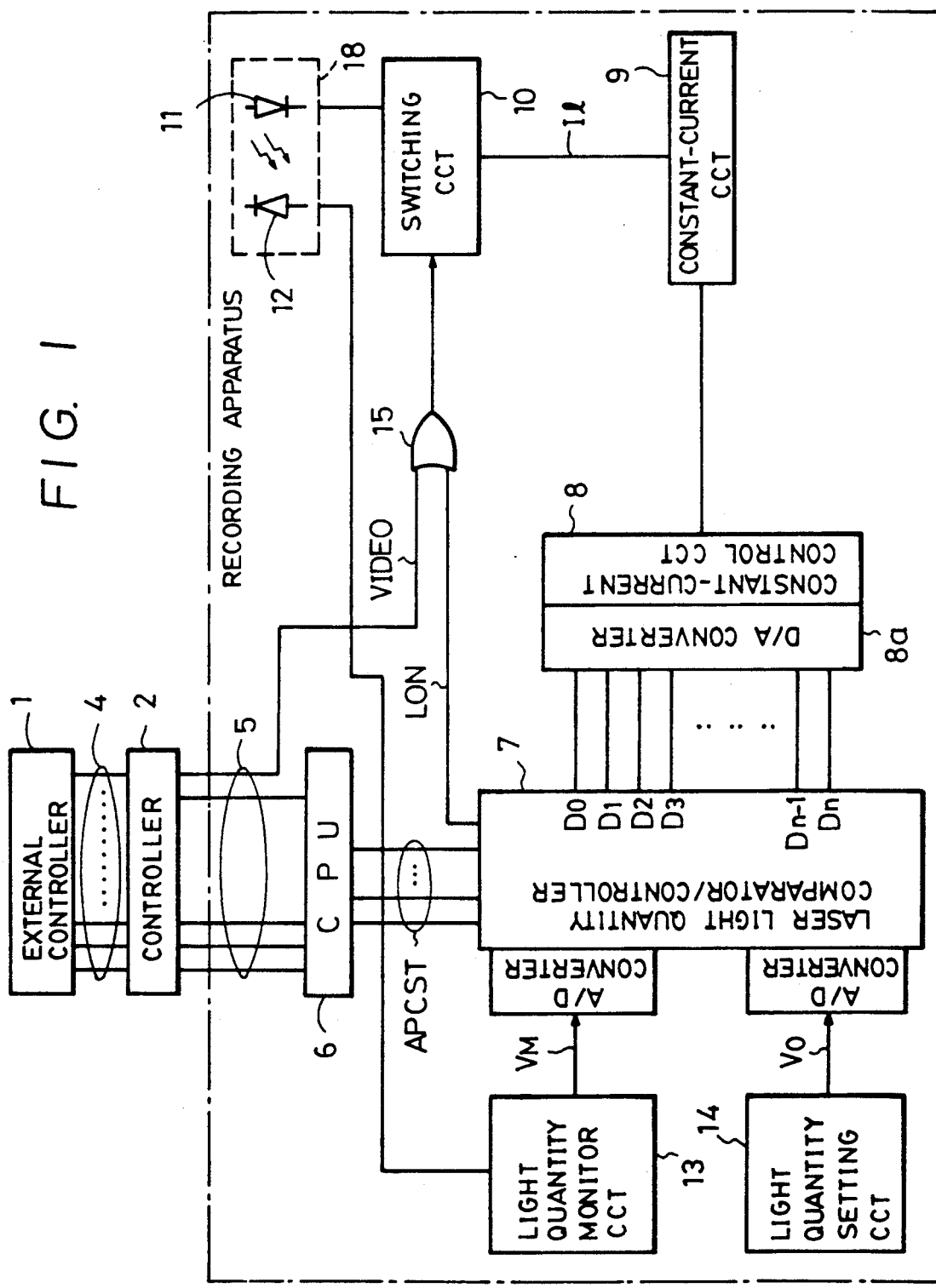
FIG. 1 is a block diagram showing an arrangement of a light quantity control device according to a embodiment of the present invention.

FIG. 1 is a block diagram showing an arrangement of a light quantity control device according to the first embodiment of the present invention. The device shown in FIG. 1 includes an external controller 1, such as a personal computer, for controlling a recording apparatus 3, such as a laser beam printer, by a standard interface (external interface) 4. Well known examples of the standard interface include RS232C, the Centronics interface, and GPIB (general purpose interface bus). The device also includes a controller 2 for converting data transmitted by the standard interface 4 into data for a internal interface 5 provided for the laser beam printer's exclusive use, and for controlling the recording apparatus 3 directly by means of the internal interface 5. The controller 2 may be mounted on an internal part of the recording apparatus 3 or the external controller 1, such as a personal computer, or disposed at an external part of the recording apparatus 3. A central processing unit (CPU) 6 is provided for performing the entire control of the recording apparatus, such as timing control of a motor mounted on the internal part of the recording apparatus 3 and temperature control of a fixing heater, which accompany information recording processing. A laser light quantity comparator/controller 7 composed of a one-chip microcomputer incorporating first and second analog-to-digital (A/D) converters is also provided. The CPU 6 and the laser light quantity comparator/controller 7 can be structured as a single CPU if the single CPU has a processing capacity which is able to control the control processing conditions properly. The A/D converters may be incorporated into the single CPU or disposed at an external part of the single CPU. The laser light quantity comparator/controller 7 may be a microcomputer such as the NEC type μCOM-87AD which incorporates a built-in timer with counting arrangements.

The device also includes a constant-current control circuit 8, which has a digital-to-analog (D/A) converter 8a connected to outputs Do-Dn of the laser light quantity comparator/controller 7, for converting the outputs Do-Dn (the outputs Do-Dn is used as a count control value) into an analog signal. In the case where the laser light quantity comparator/controller 7 is structured with a microcomputer incorporating a D/A converter, the internal data bus of the microcomputer can constitute the outputs Do-Dn. A constant-current circuit 9 controlled by the constant-current control circuit 8 and receiving a laser current Il through a switching circuit 10 is provided. A photodiode 12 is provided for receiving a laser beam emitted from a semiconductor laser 11 used as a light source. A light quantity monitor circuit 13 is provided for monitoring a detection signal supplied from the photodiode 12, and for outputting a light quantity monitor voltage $V_M$ to the first A/D converter of the laser light quantity comparator/controller 7. A light quantity setting circuit 14 structured with a register is provided for outputting an output voltage Vo to the second A/D converter of the laser light quantity comparator/controller 7. The laser light quantity comparator/controller 7 makes and holds a comparison reference value internally by processing the output voltage Vo output from the light quantity setting circuit 14 internally. An OR gate 15 is provided for performing OR logic (gate) operation between a video signal VIDEO output through the internal interface 5 and a laser turning-on signal LON which overrides the data input and unconditionally turns on the semiconductor laser 11 to execute the light quantity control of the laser.

An operation of the light quantity control device in FIG. 1 will be described below.

When the photodiode 12 detects the light quantity of the laser beam emitted from the laser 11, the D/A converter 8a converts the count control value (outputs Do-Dn) output from the laser light quantity comparator/controller 7 into an analog signal based on the detected light quantity.

In these circumstances, the time required for each change of the count control value is controlled changeably by an output from a timing control means (the laser light quantity comparator/controller 7 operates as the timing control means in this case) based on the light quantity detected by the photodiode 12. Accordingly, it is possible to change the time for completing the light quantity control in dependence on the light quantity.

The timing control means executes a low-speed change processing for changing the count control value, which is output to the D/A converter 8a, after the lapse of a period used for stabilizing the light quantity of the light beam detected by the photodiode 12, and enables the constant-current control circuit 8 to execute a constant-current control by giving priority to the stabilization of the light quantity.

The timing control means further executes a high-speed change processing for changing the count control value, which is output to the D/A converter 8a, before the lapse of the stabilization period for the light quantity of the light beam detected by the photodiode 12, and enables the constant-current control circuit 8 to execute a constant-current control by giving priority to the shortening of the time necessary for light quantity control. The timing control means executes the low-speed change processing in the range of a reference light quantity value detected by the photodiode 12, and enables the control of the light quantity while maintaining the stability of the light quantity corresponding to image writing. The D/A converter 8a converts a count control value, which is obtained at the time an initial light quantity adjustment processing of the laser 11 is completed, sequentially, and outputs the converted count control value as an initial count control value for the next control to the constant-current control circuit 8. Therefore, it is possible to decrease the number of steps used for reaching a light quantity in a stable state, and to reach this light quantity in a short time.

Figures 2A, 2B:
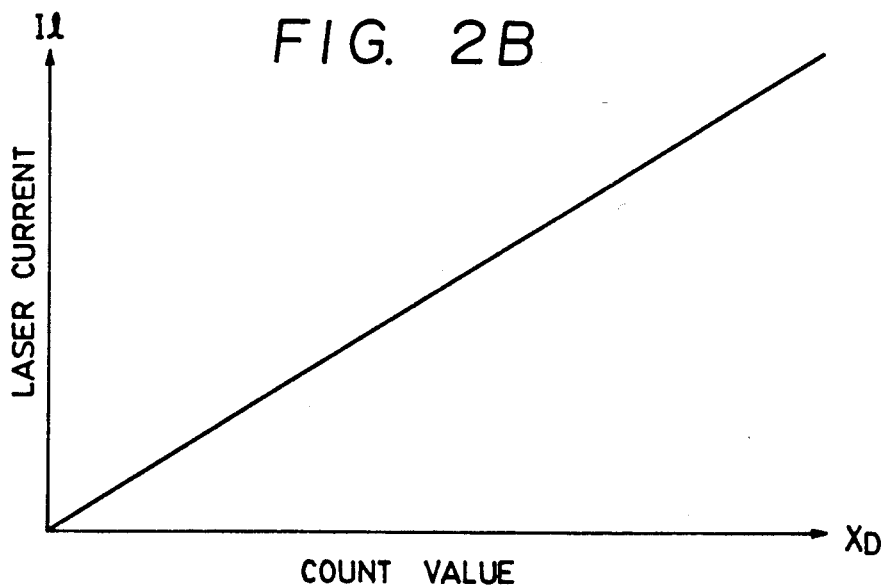
FIG. 2A is a chart for explaining output data from the laser light quantity comparator/controller shown in FIG. 1.
FIG. 2B is a chart showing the relation between the count value shown in FIG. A and the laser current.

An explanation of data output from the laser light quantity comparator/controller 7 will be described below with reference to FIG. 2A and FIG. 2B. FIG. 2A is an illustration for explaining data structures of outputs $D_o$–$D_n$ output from the laser light quantity comparator/controller 7 shown in FIG. 1. FIG. 2A shows the relation between an up-counting of the count value $X_D$ and a down-counting of the count value $X_D$. As illustrated in FIG. 2A, the count value $X_D$ input to the D/A converter 8a of the constant-current control circuit 8 is represented by an n+1 bit binary number $(D_n \times 2^n + D_{n-1} \times 2^{n-1} + \cdots + D_3 \times 2^3 + D_2 \times 2^2 + D_1 \times 2 + D_o)$ having the output $D_n$ as the most significant bit (MSB). In FIG. 2A, "0" indicates a low (L) or false level, while "1" indicates a high (H) or true level.

FIG. 2B is a chart showing the relation between the count value $X_D$ shown in FIG. 2A and the laser current Il, wherein the vertical axis denotes the laser current Il, and the horizontal axis denotes the count value $X_D$. As shown in FIG. 2B, it is assumed that the laser current Il increases proportionally with the increase of the count value $X_D$.

Figure 3:
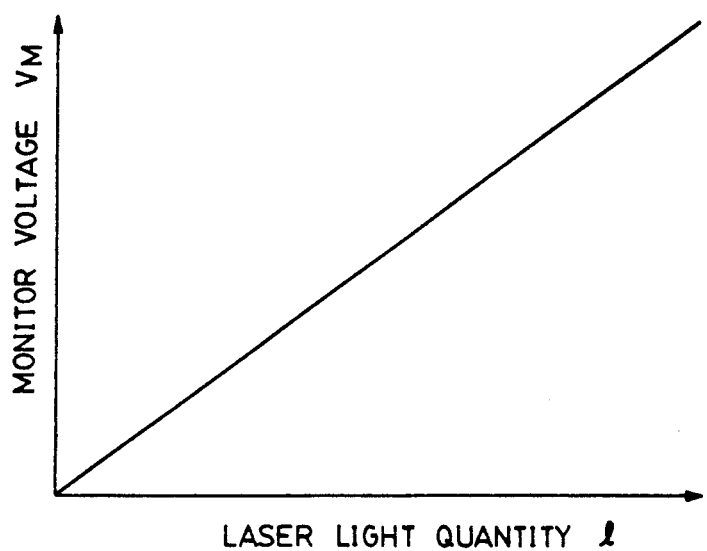
FIG. 3 is a chart showing the relation between the monitor voltage output from the light quantity monitor circuit shown in FIG. 1 and the laser light quantity.

FIG. 3 is a chart showing the relation between the monitor voltage $V_M$ output from the light quantity monitor circuit 13 shown in FIG. 1 and the laser light quantity l, where the vertical axis denotes the monitor voltage $V_M$, and the horizontal axis denotes the laser light quantity l.

As shown in FIG. 3, the laser beam emitted from the semiconductor laser 11 is photoelectrically converted by the photodiode 12 in a laser unit 18, and is processed by the light quantity monitor circuit 13 to obtain the monitor voltage $V_M$ corresponding to the laser light quantity l for feedback to the laser light quantity comparator/controller 7.

Explanations of a low-speed light quantity feedback control and a high-speed light quantity feedback control will be given below with reference to FIG. 4 and FIG. 5.

LOW-SPEED LIGHT QUANTITY FEEDBACK CONTROL

Figure 4:
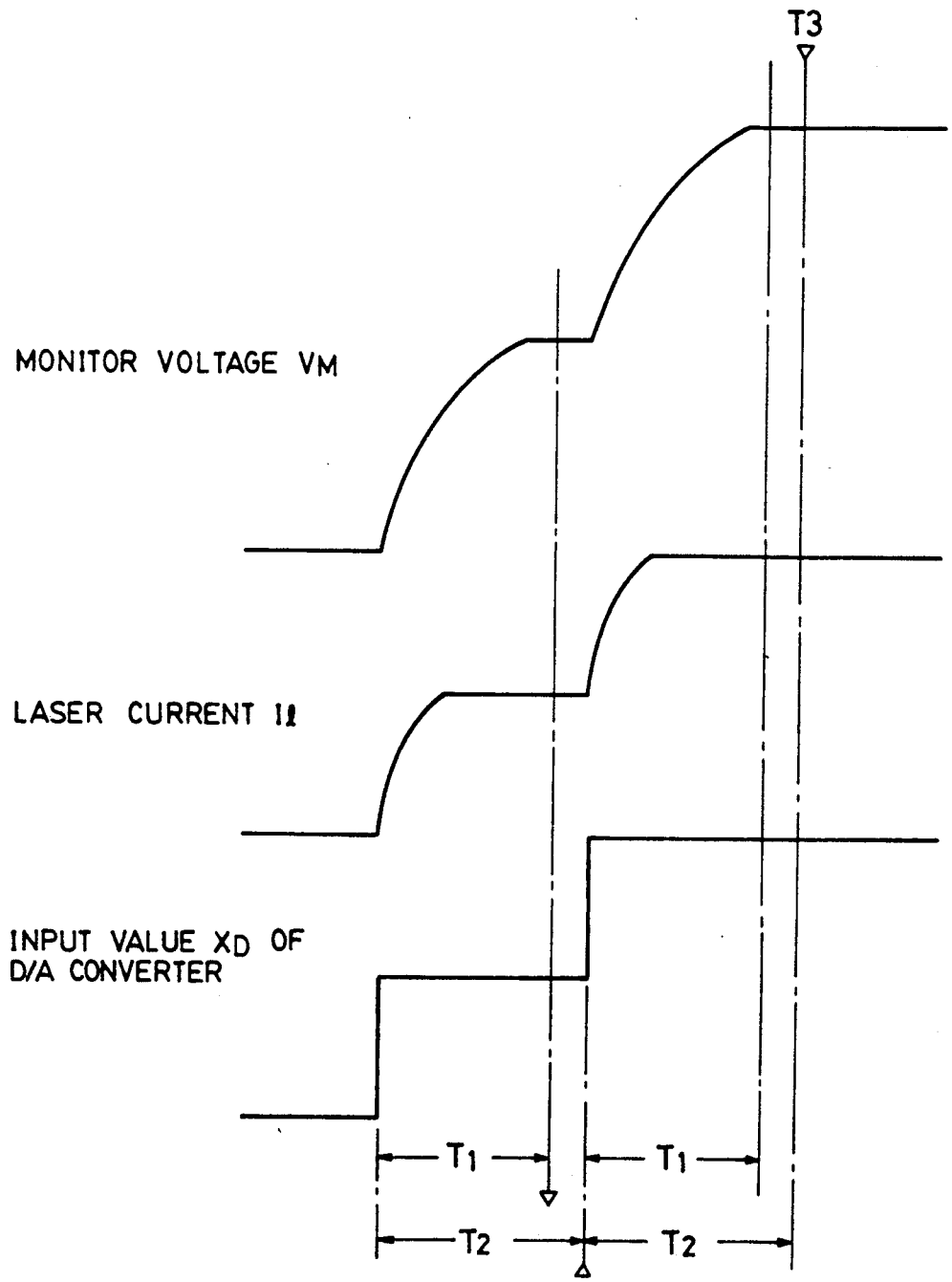
FIG. 4 is a chart for explaining a low-speed light quantity feedback control sequence of the light quantity control device.

FIG. 4 is a chart for explaining the low-speed light quantity feedback control sequence of the light quantity control device. In FIG. 4, the same reference numerals are used to denote the corresponding elements explained in FIG. 2A, FIG. 2B, and FIG. 3.

In response to the up-counting of the count value $X_D$ input to the D/A converter 8a, the laser current Il increases, thereby increasing the monitor voltage $V_M$. As shown in FIG. 4, in response to the up-counting of the count value $X_D$, a certain time lag occurs until the monitor voltage $V_M$ is stabilized. The time lag depends on a time constant or a response of the circuit.

Accordingly, in the case where the low-speed light quantity feedback control is executed, the count value $X_D$ is counted up at the lapse of time T2, after being held for a response time T1 (T2>T1).

According to the above-described structure, the light quantity can be stabilized although the stabilization of the light quantity control may take time.

For this reason, the present embodiment employs the low-speed or high-speed light quantity feedback control based on a difference between a predetermined voltage $V_A$ and a difference voltage of the monitor voltage $V_M$ and a prescribed light quantity voltage $V_T$ provided for the laser 11. Thereby the light quantity control can be completed, at time T3, at high speed while not affecting the stabilization of the light quantity.

HIGH-SPEED LIGHT QUANTITY FEEDBACK CONTROL

Figure 5:
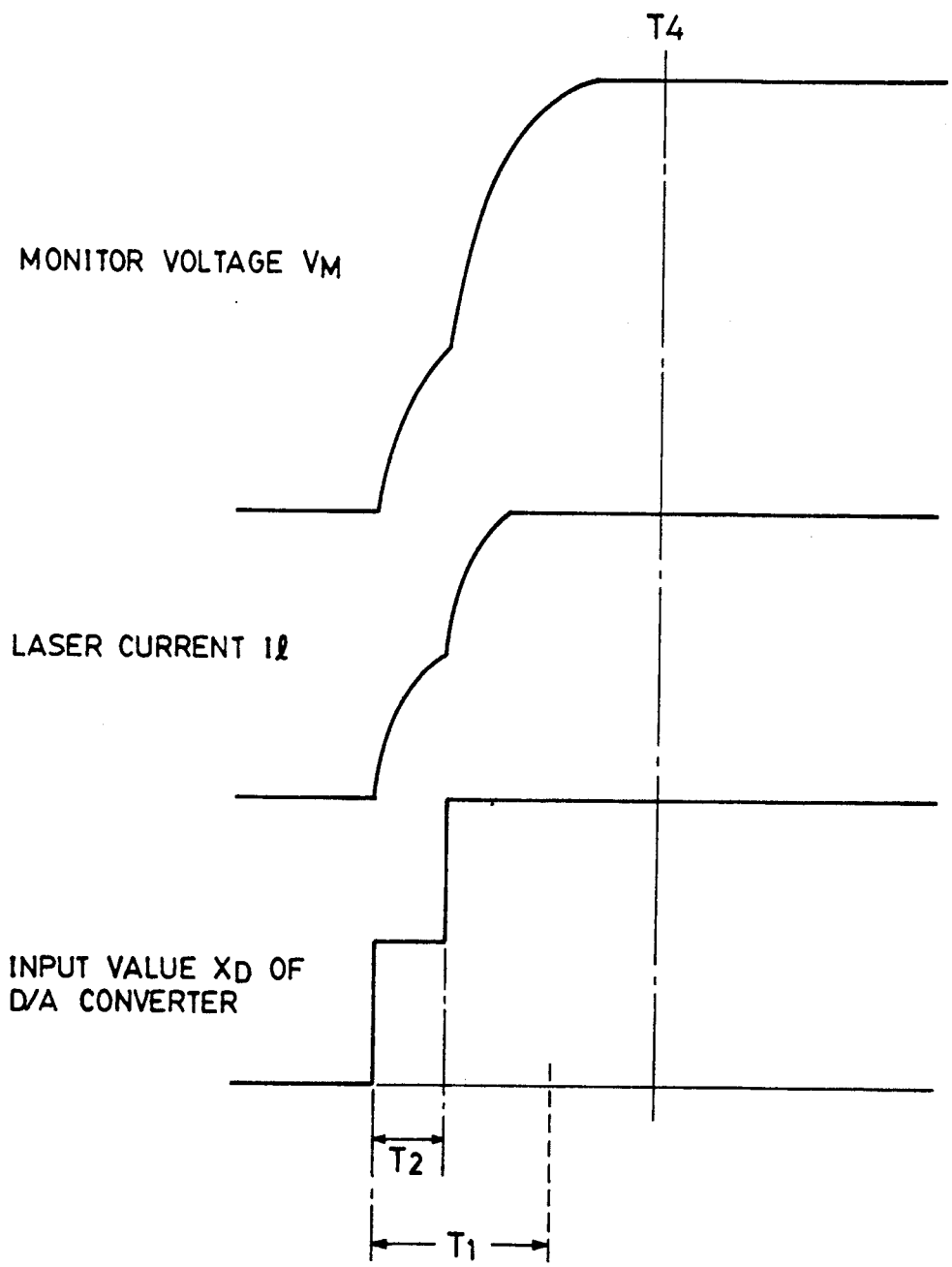
FIG. 5 is a chart for explaining a high-speed light quantity feedback control sequence of the light quantity control device.

FIG. 5 is a chart for explaining the high-speed light quantity feedback control sequence of the light quantity control device. In FIG. 5, the same reference numerals are used to denote the corresponding elements explained in FIG. 2A, FIG. 2B, and FIG. 3. As shown in FIG. 5, in response to the up-counting of the count value $X_D$ input to the D/A converter 8a, the control decides whether the count value $X_D$ is counted up to its proper value or not at the lapse of time T2, rather than the count value $X_D$ being held for response time T1, which is used for stabilizing the monitor voltage $V_M$. Thereby the up-counting processing of the count value $X_D$ is executed at high speed, and the light quantity control can be completed, at time T4, at high speed.

A light quantity control operation of the light quantity control device will be described below with reference to FIG. 6.

Figure 6:
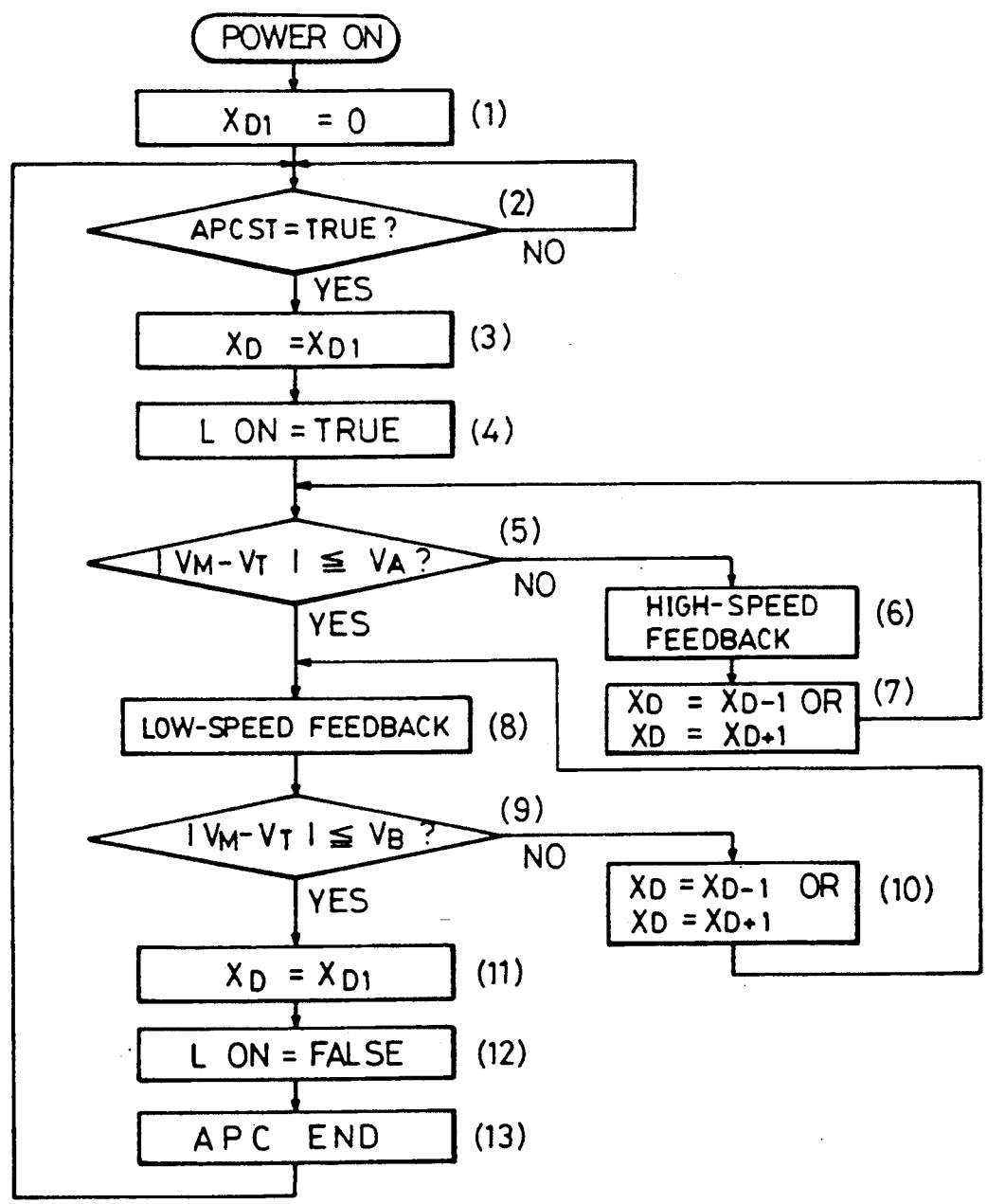
FIG. 6 is a flow chart for explaining an example of light quantity control procedure in the light quantity control device.

FIG. 6 is a flow chart for explaining an example of the light quantity control procedure in the light quantity control device. In FIG. 6, numerals (1)–(13) denote each step.

When a power source of the apparatus is turned on, the flow starts, and all information of the printer is cleared.

Figure 7:
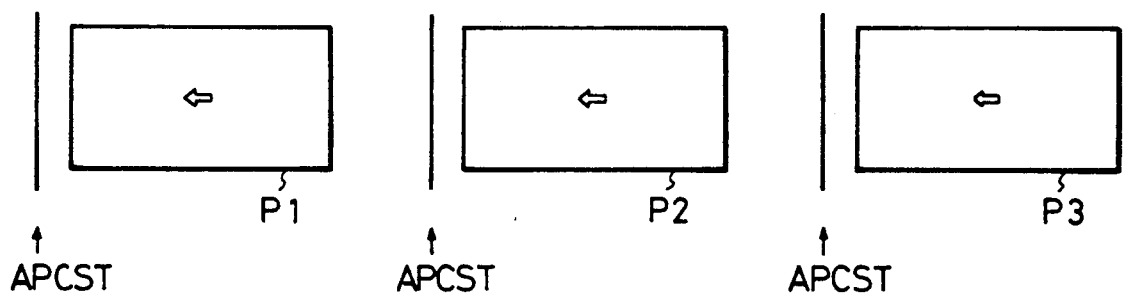
FIG. 7 is a illustration for explaining a light quantity adjusting timing of the light quantity control device.

In step (1), a closed count value $X_{D1}$ of the last automatic light quantity control is cleared (i.e., $X_{D1} = 0$). In these circumstances, the laser light quantity comparator/controller 7 stands by to wait for transmission (TRUE state) of an auto light quantity control start signal (APCST) sent from the CPU6 in step (2). When the auto light quantity control start signal (APCST) is transmitted, the laser light quantity comparator/controller 7 sets the count value $X_D$ equal to the closed count value $X_{D1}$ of the last automatic light quantity control in step (3). The count value $X_D$ is used as a input signal to the D/A converter 8a of constant-current circuit 8. In the case where the first automatic light quantity control is performed after turning on the power source, the count value $X_D$ is set at "0" because the closed count value $X_{D1}$ is set at "0" in step (1). The auto light quantity control start signal (APCST) is output during an interval of each recording sheet P1-P3 in the case of consecutive printings shown in FIG. 7. The first auto light quantity control start signal (APCST) is output from the CPU6 just before the image writing to a recording sheet. In step (4), the laser light quantity comparator/controller 7 shifts the laser turning-on signal LON to a true level, to open the gate of the switching circuit 10, thereby supplying the semiconductor laser 11 with a laser current Il. As explained above, the constant-current control circuit 8 having the D/A convertor 8a is controlled by the up-counting or the down-counting of the digital value taken from the outputs $D_o$-$D_n$ from the laser light quantity comparator/controller 7, thereby varying the laser current Il in the laser 11 by an analog value corresponding to the up-counting or the down-counting, through the constant-current circuit 9. In step (5), the laser light quantity comparator/controller 7 checks whether a condition $|V_M-V_T| \leq Va$ ($|V_M-V_T|$ shows a difference between the prescribed light quantity voltage $V_T$ corresponding to the prescribed light quantity $l_T$ and the monitor voltage $V_M$) is satisfied or not. If it is not, the above explained high-speed light quantity feedback control is executed in step (6). In steps (7), the count value is counted down, i.e., a formula $X_D = X_D - 1$ is executed, if a condition $V_M-V_T \geq 0$ is satisfied, but the count value is counted up, i.e., a formula $X_D = X_D + 1$ is executed, if a condition $V_M-V_T \leq 0$ is satisfied. Then the flow returns to step (5). In step (7), the step of the count value is not limited to "one"; rather the step of the count value can be set changeably, e.g., "2" or "3" or "n." It is also possible to change the number of steps for up-counting or down-counting in dependence on the monitor voltage $V_M$.

Meanwhile, when in step (5) the answer is yes, the low-speed light quantity feedback control is executed in step (8). In step (9), the laser light quantity comparator/controller 7 checks whether a condition $|V_M-V_T| \leq V_B$ is satisfied or not. If it is not, the the flow advances to step (10). In step (10), if a condition $V_M-V_T \geq 0$ is satisfied, the count value is counted down, i.e., a formula $X_D = X_D - 1$ is executed, but if a condition $V_M-V_T < 0$ is satisfied, the count value is counted up, i.e., a formula $X_D = X_D + 1$ is executed. Then the flow returns to step (9). Meanwhile, if the answer in step (9) is yes, the present count value $X_D$ is held in an internal memory of the CPU6 as a closed count value $X_{D1}$ in step (11).

In step (12), laser light quantity comparator/controller 7 shifts the laser turning-on signal LON to a false level. Consequently, image recording can be performed by the video signal VIDEO sent from the controller 2. In step (13), the auto light quantity control is completed. Then the flow returns to step (2).

An explanation of a difference between an auto light quantity control performed at a time when the power source is turned on and an auto light quantity control performed at the next time will be described below with reference to FIG. 8-FIG. 10.

FIG. 8 is a chart showing the relation between the monitor voltage $V_M$ of an initial APC processing and the count value $X_D$, wherein the horizontal axis denotes a time, the upper vertical axis denotes the monitor voltage $V_M$, and the lower vertical axis denotes the count value $X_D$.

As shown in FIG. 8, the count value $X_D$ output from the laser light quantity comparator/controller 7 to the D/A converter 8a is increased sequentially from "0, " and the semiconductor laser 11 starts to emit the laser beam when the count value $X_D$ exceeds a count value corresponding to the threshold value $I_{th}$ of the semiconductor laser 11, whereby the monitor voltage $V_M$ is output. When the monitor voltage $V_M$ is beyond a predetermined voltage ($V_A$), that is, when the monitor voltage $V_M$ is within a region A, the count value $X_D$ output from the laser light quantity comparator/controller 7 to the D/A converter 8a is counted up at high speed. When the monitor voltage $V_M$ is within the predetermined voltage ($V_A$), i.e., a region B, by the up-counting of the count value $X_D$, the low-speed light quantity feedback control is executed. The APC processing is completed when the monitor voltage $V_M$ reaches the prescribed light quantity voltage $V_T$.

Figure 9:
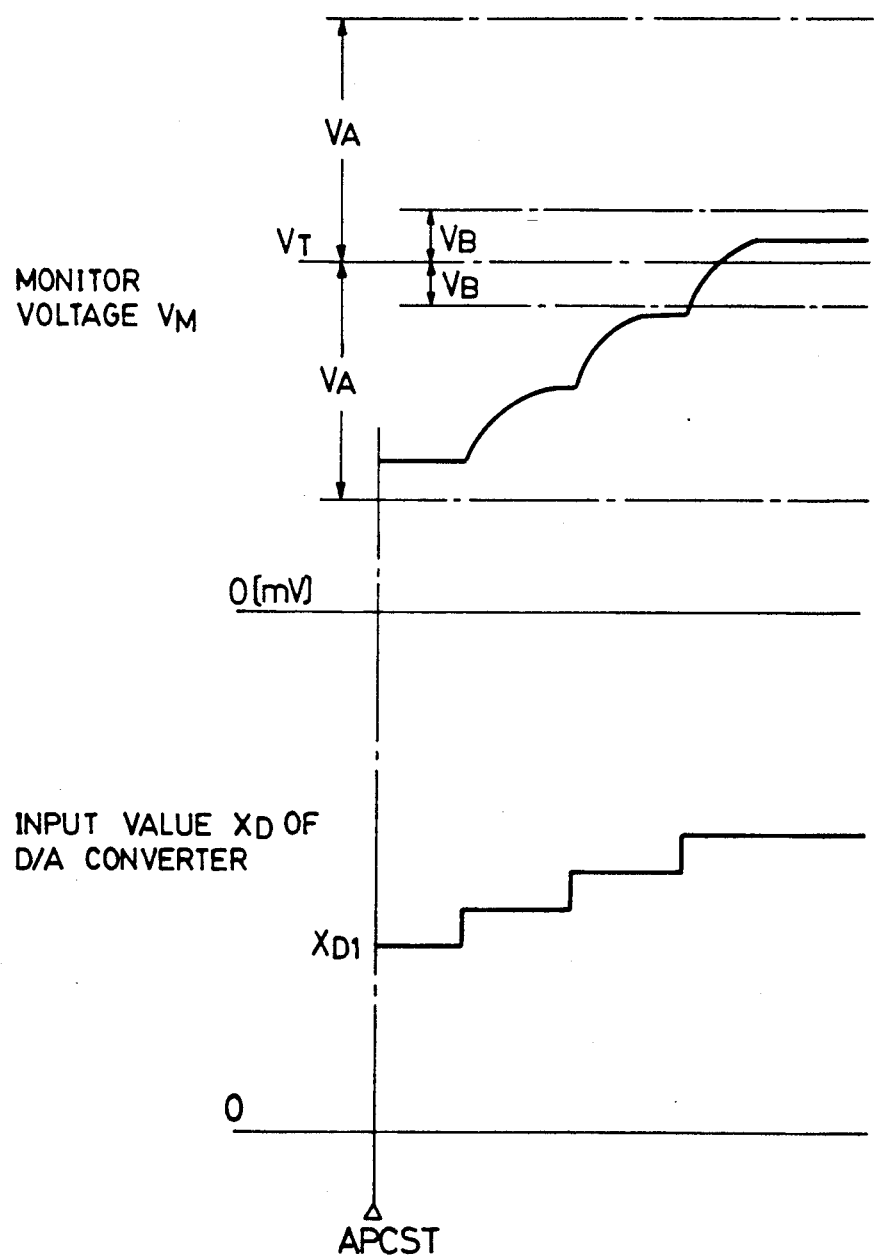
FIG. 9 and FIG. 10 are charts showing the relation between the monitor voltage of an APC processing after the initial APC processing and the count value.
Figure 10:
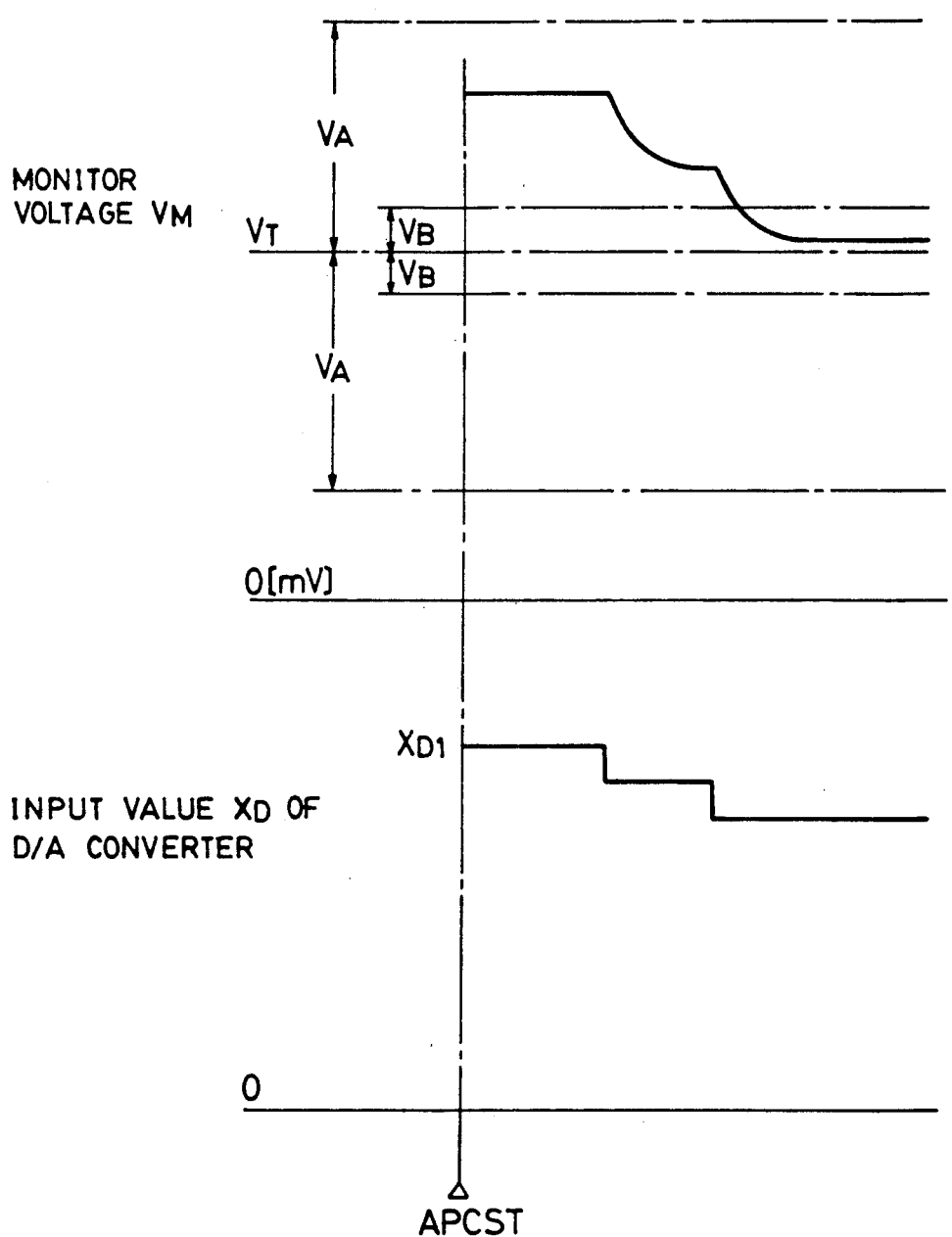

FIG. 9 and FIG. 10 are charts showing the relation between the monitor voltage $V_M$ of an APC processing after the initial APC processing and the count value $X_D$, wherein the horizontal axis denotes time, the upper vertical axis denotes the monitor voltage $V_M$, and the lower vertical axis denotes the count value $X_D$.

An explanation of the APC processing will be described below with reference to FIG. 6.

In the case where the count value $X_D$ of the last automatic light quantity control is not set at "0," the closed count value $X_{D1}$ should not be set at "0" in step (3). To put it concretely, the automatic light quantity control (APC) processing is started from a time when the auto light quantity control start signal (APCST) is shifted to a true level. In step (3), a count value set to the D/A converter 8a in the last automatic light quantity control, that is, the closed count value $X_{D1}$, is set as the count value $X_D$. In step (5), the monitor voltage $V_M$ should be a closed voltage of the last automatic light quantity control corresponding to the count value $X_D$ at a time when the laser turning-on signal is shifted to a true level as shown in FIG. 9 or FIG. 10.

In step (5), the laser light quantity comparator/controller 7 checks the monitor voltage $V_M$. If the condition $|V_M-V_T| \leq V_A$ is not satisfied, the flow advances to step (6), (7), and the high-speed light quantity feedback control is executed as described above.

Meanwhile, the condition $|V_M-V_T| \leq V_A$ is often satisfied because the closed count value $X_{D1}$ of the last automatic light quantity control is adopted. If the condition $|V_M-V_T| \leq V_A$ is satisfied, the low-speed light quantity feedback control is executed in step (8).

In step (9), the laser light quantity comparator/controller 7 checks whether the condition $|V_M-V_T| \leq V_A$ is satisfied or not.

If it is not, the flow advances to step (10). In step (10), the up-counting (see FIG. 9) or the down-counting (see FIG. 10) of the count value $X_D$ is executed, and thereby an appropriate count value $X_D$ is set by a fewer number of steps.

According to the above-described structure, a control time for reaching the prescribed light quantity voltage $V_T$, i.e., a time from the initiation of the APC processing to the completion of the APC processing, can be shortened sharply.

In the above-described embodiment, the up-counting or the down-counting of the count value $X_D$ is performed under the condition that a time for changing the count value is constant. However, in the case where a response of the circuit to the change operation of the count value $X_D$ or a sampling time of the CPU6 is slow, the count value $X_D$ should be held every predetermined number of up-counting or down-counting as shown in FIG. 9 or FIG. 10. Thereby the count value $X_D$ can be counted up or counted down in a state that the monitor voltage $V_M$ is stabilized.

EMBODIMENT 2

Figure 11:
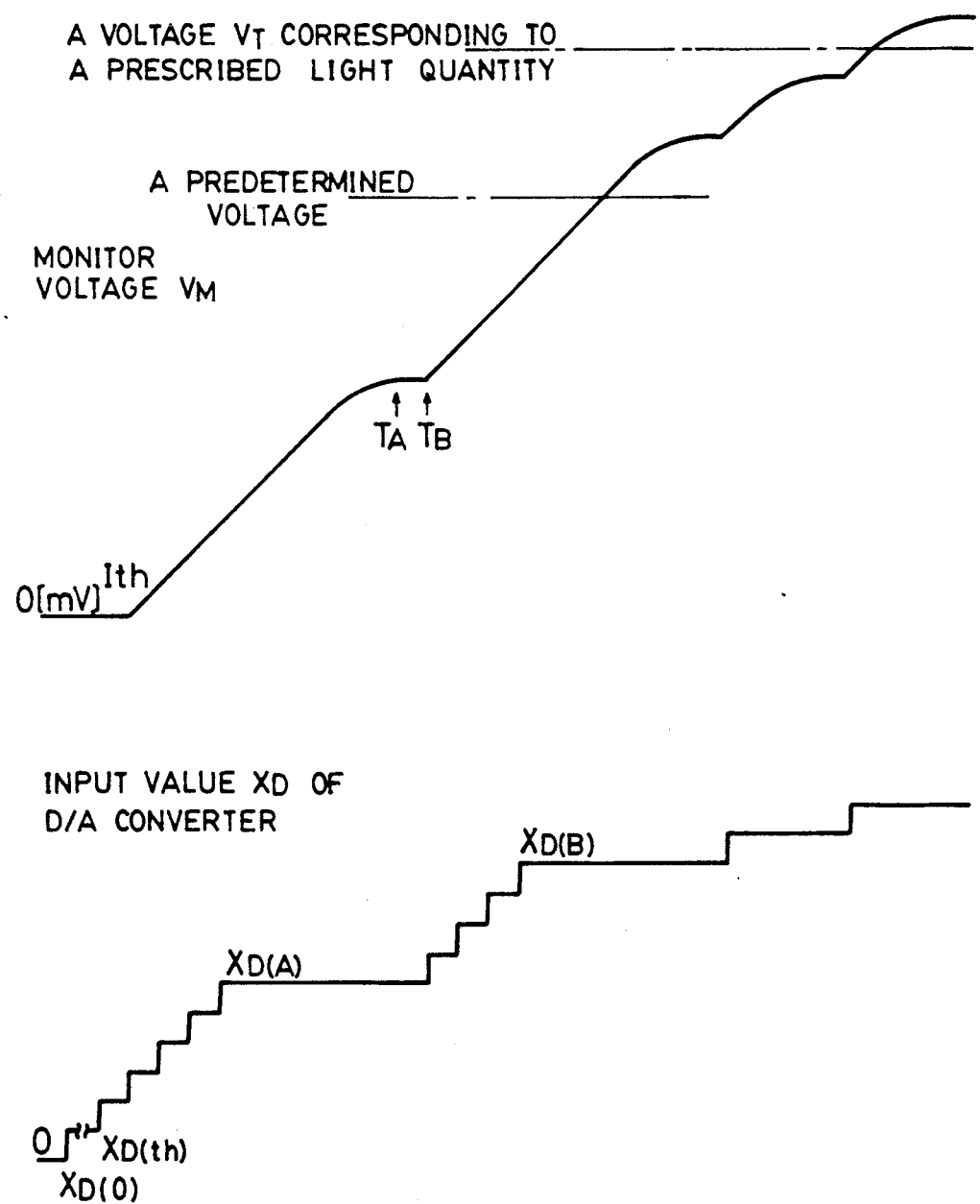
FIG. 11 is a chart showing an APC processing of the light quantity control device according to a second embodiment of the present invention.

FIG. 11 is a chart showing an APC processing of the light quantity control device according to a second embodiment of the present invention. In FIG. 11, the same reference numerals are used to denote the corresponding elements shown in FIG. 10.

As shown in FIG. 11, when the power source of the apparatus is turned on, the count value $X_D$ received by the D/A converter 8a starts from "0," i.e., a count value $X_{D(O)}$. When the count value $X_D$ coincides with a count value $X_{D(th)}$, the laser current $I_l$ exceeds a threshold value current $I_{th}$ of the semiconductor laser 11, so that the semiconductor laser 11 starts to emit the laser beam.

In the case where a response of the circuit to the change operation of the count value $X_D$ or a sampling time of the CPU6 is slow, a predetermined number of up-counting steps are executed to obtain a count value $X_{D(A)}$, and the count value $X_{D(A)}$ is held until the monitor voltage $V_M$ corresponding to the count value $X_{D(A)}$ is stabilized. After the stabilization of the monitor voltage $V_M$, the up-counting of the count value $X_D$ is restarted to execute a predetermined number of up-counting steps for obtaining a count value $X_{D(B)}$. After the predetermined number of up-counting steps are executed, the count value $X_{D(B)}$ is held for stabilizing the monitor voltage $V_M$. When the stabilized monitor voltage $V_M$ corresponding to the count value $X_{D(B)}$ is within a predetermined range, that is, when the condition $|V_M - V_T| \leq V_A$ is satisfied, the above-described low-speed light quantity control is executed, thereby the light quantity is controlled to comply with the prescribed light quantity voltage $V_T$.

In the above-described embodiment, the light quantity control is carried out by using a count value having a constant step. However, it is possible to shorten the time of the light quantity control by combining such processing where the step for counting is large in the initial control, and the step gets smaller when the light quantity exceeds a predetermined level as shown in U.S. Pat. No. 4,890,288 (see FIG. 15).

EMBODIMENT 3

Figure 12:
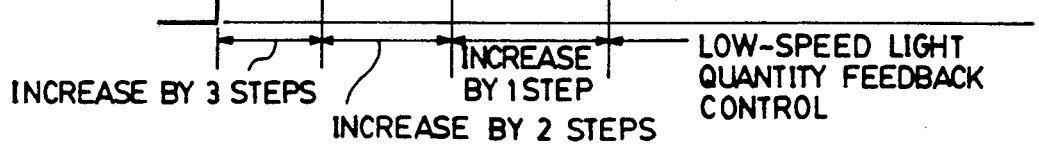
FIG. 12 is a chart showing an APC processing of a light quantity control device according to a third embodiment of the present invention.

FIG. 12 is a chart for showing an APC processing of the light quantity control device according to a third embodiment of the present invention. In FIG. 12, the same reference numerals are used to denote the corresponding elements shown in FIG. 10.

As shown in FIG. 12, predetermined voltages VA, VB, VC are provided as critical voltages. The high-speed count is increased by 3 counts at a time when the monitor voltage $V_M$ is lower than the predetermined voltage VC. The high-speed count is increased by 2 counts at a time when the monitor voltage $V_M$ exceeds the predetermined voltage VC. Then, the high-speed count is increased by 1 count at a time when the monitor voltage $V_M$ exceeds the predetermined voltage VB. The high-speed count, i.e., the high-speed light quantity feedback control, should be changed over to the low-speed light quantity feedback control when the monitor voltage $V_M$ exceeds the predetermined voltage VA.

According to the above-described structure, a time of the light quantity control can be shortened sharply.

As mentioned above, according to the present invention, high-speed and high-precision light quantity control can be provided.

Although particular embodiments of the present invention are herein disclosed for purposes of explanation, various modifications thereof, after study of this specification, will be apparent to those skilled in the art to which the invention pertains.

What is claimed is:

1. A light quantity control device comprising:
   beam generating means; monitor means for monitoring a quantity of light of beam generated by said beam generating means and providing an output; and control means for controlling the light quantity of the beam generated by said beam generating means in response to the output of said monitor means, wherein said control means comprises:
   digital value output means for outputting a digital value representing the quantity of light of the beam and a light quantity control circuit for controlling the quantity of light in response to the digital value, and means for varying the timing of output of the digital value in accordance with the output of said monitor means so as to cause the quantity of light to be a predetermined level.

2. A light quantity control device according to claim 1, wherein said beam generating means comprises a semiconductor laser.

3. A light quantity control device according to claim 1, wherein said monitor means detects the quantity of light of the beam as a monitor voltage.

4. A light quantity control device according to claim 1, wherein said digital value output means comprises counting means for counting the digital value and outputting a digital count value, and wherein said light quantity control circuit comprises:
   digital-to-analog converter means for effecting digital-to-analog conversion of the digital count value supplied from said counting means and producing an output; and
   drive current control circuit for controlling a drive current for said beam generating means in response to the output of said digital-to-analog converter.

5. A light quantity control device according to claim 4, wherein said counting means varies the digital count value at a first timing when the output of said monitor means is in a first range, and varies the digital count value at a second timing different from the first timing when the output of said monitor means is in a second range different from the first range.

6. A light quantity control device according to claim 1 wherein said control means includes setting means for setting the intensity of the beam generated from said beam generating means.

7. A light quantity control device according to claim 1, wherein said digital value output means comprises microcomputer means for effecting a counting operation to count the digital value in accordance with a predetermined program, and for effecting the counting operation at a first timing when the output of said monitor means is in a first range, and for effecting the counting operation at a second timing slower than the first timing when the output of said monitor means is in a second range.

8. A light quantity control device comprising:
beam generating means;
monitor means for monitoring a quantity of light of a beam generated by said beam generating means and providing an output; and
control means for controlling the light quantity of the beam generated by said beam generating means in response to the output of said monitor means, wherein said control means comprises:
counting means for counting a digital count value representing a quantity of light of the beam; and
discrimination means for discriminating whether the output of said monitor means reaches a predetermined level, wherein said counting means varies the digital count value at a first predetermined timing when the discrimination means discriminates that the output of said monitor means is lower than the predetermined level, and varies the digital count value at a second predetermined timing when the discrimination means discriminates that the output of said monitor means reaches the predetermined level.

9. A light quantity control device according to claim 8, wherein said control means includes: a digital-to-analog converter for effecting digital-to-analog conversion of the digital count value supplied from said counting means and providing an output, and a drive current control circuit for controlling a drive current for said beam generating means in response to the output of said digital-to-analog converter.

10. A light quantity control device according to claim 9, wherein said control means includes microcomputer means for counting the digital count value in accordance with a predetermined program.

11. A light quantity control device according to claim 9, wherein said beam generating means comprises a semiconductor laser.

12. A light quantity control device comprising: beam generating means; monitor means for monitoring a quantity of light of a beam generated by said beam generating means and providing an output; and
control means for controlling the light quantity of the beam generated by said beam generating means in accordance with the output of said monitor means, wherein said control means comprises:
digital value output means for outputting a digital value representing the quantity of light of the beam, and
means operating in a first mode for varying the speed of change of the digital value, and operating in a second mode for varying the amount of change of the digital value.

13. A light quantity control device according to claim 12, wherein said control means includes discrimination means for discriminating whether the output of said monitor means reaches a predetermined level and wherein said digital value output means varies the digital value at a first speed when the discrimination means discriminates that the output of said monitor means is lower than the predetermined level, and varies the digital value at a second speed when the discrimination means discriminates that the output of said reaches the predetermined level.

14. A light quantity control device according to the claim 13, wherein said digital value output means varies the amount of change of the digital value in accordance with the output of said monitor means when the discrimination means discriminates that the output of said monitor means is lower than the predetermined level.

15. A method for controlling light quantity comprising the steps of:
generating a beam of light; monitoring a quantity of light of the generated light beam and providing an output; and
controlling the light quantity of the generated light beam in response to the provided monitored output,
wherein the controlling step comprises: outputting a digital value representing the quantity of light of the beam and controlling the quantity of light in response to the digital value, and
varying the timing of output of the digital value in accordance with the provided monitored output so as to cause the quantity of light to be a predetermined level.

16. A method for controlling light quantity comprising the steps of:
generating a light beam;
monitoring a quantity of light of the generated light beam and providing an output; and
controlling the light quantity of the generated light beam in response to the provided monitored output, wherein said controlling step comprises:
counting a digital count value representing a quantity of light of the beam; and
discriminating whether the provided monitored output reaches a predetermined level, wherein the counting varies the digital count value at a first predetermined timing when the provided monitored output is lower than the predetermined level, and the counting varies the digital count value at a second predetermined timing when the provided monitored output reaches the predetermined level.

17. A method for controlling light quantity comprising the steps of:
generating a light beam; monitoring a quantity of light of the generated light beam and providing an output; and
controlling the light quantity of the generated light beam in accordance with the monitored output,
wherein said controlling step comprises:
outputting a digital value representing the quantity of light of the generated light beam, and operating in a first mode for varying the speed of change of the digital value, and operating in a second mode for varying the amount of change of the digital value.

* * * * *

UNITED STATES PATENT AND TRADEMARK OFFICE
CERTIFICATE OF CORRECTION

PATENT NO. : 5,151,910

DATED : September 29, 1992

INVENTOR(S) : TOSHIHIKO INUYAMA, ET AL.

Page 1 of 3

It is certified that error appears in the above-identified patent and that said Letters Patent is hereby corrected as shown below:

On the title page:

Item (75) Inventors:

"Kanagawa" (all ocurrences) should read --Kanagawa-ken--.

Item (56) References Cited:

Under FOREIGN PATENT DOCUMENTS:
"1025491" should read --10295491--.

COLUMN 1

Line 14, "an" should read --a--.
Line 16, "a" should read --an--.
Line 24, "tHE" should read --the--.
Line 55, "D/A convertor," should read --D/A converter,--.

COLUMN 2

Line 21, "It is still" should read --Still--.

COLUMN 3

Line 12, "a" (second occurrence) should read --an--.
Line 18, "FIG. A" should read --FIG. 2A--.
Line 31, "a" (first occurrence) should read --an--.
Line 62, "Well known" should read --Well-known--.
Line 67, "a" should read --an--.

COLUMN 5

Line 47, "D2" should read --$D_2$--.

UNITED STATES PATENT AND TRADEMARK OFFICE
CERTIFICATE OF CORRECTION

PATENT NO. : 5,151,910
DATED : September 29, 1992
INVENTOR(S) : TOSHIHIKO INUYAMA, ET AL.

It is certified that error appears in the above-identified patent and that said Letters Patent is hereby corrected as shown below:

COLUMN 6

Line 49, "response time T1," should read
--response time T1 (T2<T1),--.

COLUMN 7

Line 6, "a" should read --an--.
Line 23, "vertor 8a" should read --verter 8a--.
Line 36, "steps (7)," should read --step (7),--.
Line 51, "the the" should read --the--.
Line 57, "step (9)." should read --step (8).--.

COLUMN 8

Line 54, "step (6), (7)," should read --steps (6), (7),--.

COLUMN 10

Line 22, "means; monitor" should read --means; ¶ monitor--.
Line 23, "of beam" should read --of a beam--.
Line 25, "and control" should read --and ¶ control--.
Line 63, "1 wherein" should read --1, wherein--.

COLUMN 11

Line 45, "comprising: beam" should read
--comprising: ¶ beam--.
Line 46, "means; monitor" should read --means; ¶ monitor--.

UNITED STATES PATENT AND TRADEMARK OFFICE
CERTIFICATE OF CORRECTION

PATENT NO. : 5,151,910
DATED : September 29, 1992
INVENTOR(S) : TOSHIHIKO INUYAMA, ET AL.

It is certified that error appears in the above-identified patent and that said Letters Patent is hereby corrected as shown below:

<u>COLUMN 12</u>

Line 7, "said reaches" should read --said monitor means reaches--.
Line 9, "the" should be deleted.
Line 17, "light; monitoring" should read --light; ¶ monitoring--.
Line 23, "comprising: outputting" should read --comprising: ¶ outputting--.
Line 51, "beam; monitoring" should read --beam; ¶ monitoring--.

Signed and Sealed this

Fifteenth Day of March, 1994

Attest:

BRUCE LEHMAN

*Attesting Officer*     *Commissioner of Patents and Trademarks*